United States Patent [19]
Cone

[11] 3,903,744
[45] Sept. 9, 1975

[54] ELECTRONIC THERMOMETER
[76] Inventor: Robert A. Cone, 599 River Rd., Piermont, N.Y. 10968
[22] Filed: July 18, 1973
[21] Appl. No.: 380,255

[52] U.S. Cl. ............................ 73/362 AR; 200/220
[51] Int. Cl. ....................... G01k 7/24; H01h 29/22
[58] Field of Search ................ 73/362 AR; 200/220

[56] References Cited
UNITED STATES PATENTS

| | | | |
|---|---|---|---|
| 2,290,869 | 7/1942 | Fingold | 200/220 X |
| 2,367,888 | 1/1945 | Prideaux | 200/220 X |
| 3,139,753 | 7/1964 | Brudner | 73/362 A |
| 3,466,014 | 9/1969 | Pottgens | 200/220 X |
| 3,593,581 | 7/1971 | Beightol | 73/362 A |

*Primary Examiner*—Richard C. Queisser
*Assistant Examiner*—Frederick Shoon
*Attorney, Agent, or Firm*—Arthur A. March, Esq.

[57] ABSTRACT

An electronic temperature measuring and indicating device, in which a sensing head which is exposed to the temperature to be measured, is connected to a conventional electronic analog to digital read-out device. A battery supplies the power to the unit and is connected through a mercury switch to the analog digital converter. When the thermometer is held in its upright operating position, the mercury switch establishes contact between wires leading from the switch and the battery. When the device is not in use and is placed in a substantially horizontal position, the mercury flows to a portion of a switch chamber in which no electrical connection is made between the wires, and the thermometer in its "off" position causes no drain on the battery. All components are completely encased within a sealed, leak-proof housing.

4 Claims, 4 Drawing Figures

PATENTED SEP 9 1975 3,903,744

ELECTRONIC THERMOMETER

This invention relates to thermometers and more particularly to thermometers provided with digital means for displaying the temperature in easily readable numerals.

BACKGROUND OF THE INVENTION

Heretofore, manually maniputable battery powered thermometers have been proposed which include temperature sensing elements and a digital circuit coupled to the temperature sensing elements. In such devices the temperature indicated by the temperature sensitive element is coupled to an appropriate read-out display unit so that the temperature indicating count may be read. Such thermometers as well as others using electrically operated meters have been provided with manually operated buttons or swtiches in order to shut off the operation and prevent drainage of the battery or other power means.

The temperature sensing element must of course be washed and in order to prevent the liquid from passing into the chamber containing the electrical components, the temperature sensing element has been connected to the device at a place remote from the read-out means. Such structures and arrangements have been quite inconvenient and expensive. Furthermore, prior thermometers are not so constructed as to provide for an automatically operated cut-off switch.

SUMMARY OF THE INVENTION

The present invention overcomes the aforesaid problems in that it provides a digital read-out electronic thermometer in which there are no exposed switches, buttons or the like on the exterior of the casing containing the electronic components for effecting a temperature read-out. Furthermore, the present invention provides a thermometer in which there is no need to manually operate an exposed switch to set the thermometer to its off position to thereby relieve and prevent any drain on the battery or other power means.

In essence, the thermometer of the present invention comprises a temperature sensing head which is an integral part of the units, and a sealed housing containing various electronic components. A battery may be used as the power source although any conventional source of electrical power may be utilized. An electrical connection is made through the battery and a switch enclosed within the housing to a conventional analog to digital converter which in turn is electrically connected to both a numerical display unit for electronic digital read-outs and the sensing head.

Furthermore, the thermometer of the present invention is so constructed that when it is held in an upright position for measuring the temperature of a liquid or the like, the switch will establish the circuitry through all the components. However, when the thermometer is not in use and is laid down in a substantially horizontal position in the usual fashion, the switch means, which are preferably mercury, flows to a portion of the switch chamber in which it does not establish contact between the electrical leads and a circuit is not established. The thermometer is thus in its off position and causes no drain on the battery or other power means.

In this construction the assembly is entirely leakproof and functions so that when not used there is no effect whatsoever on the power means.

In the following specification and drawings the illustrative forms and description thereof are merely to facilitate an understanding of the invention and do not in any way limit the scope thereof.

DETAILED DESCRIPTION OF THE INVENTION

Figure 1:
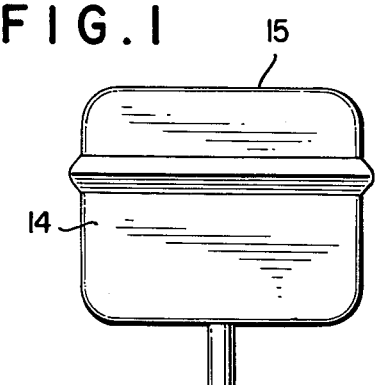
FIG. 1 is a side view of the thermometer of the present invention.
Figure 3:
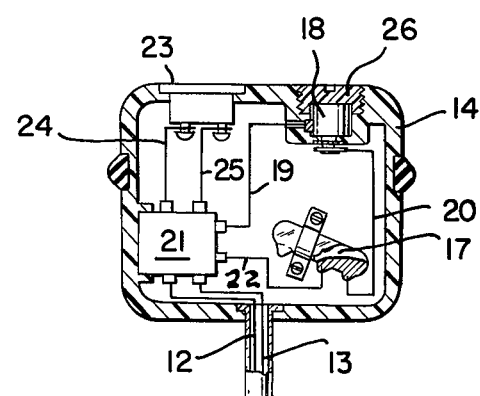
FIG. 3 is a section taken along the lines 3—3 of FIG. 2.

Referring specifically to the illustrative form of the present invention shown in the drawings, there is provided a thermometer 10 which has a temperature sensing probe 11. Interiorly of the probe is, for example, a thermometer element having a varying resistance depending upon the temperature around the probe. The two ends of the thermistor elements are connected to two wires 12 and 13 which extend into the housing 14. The unit may be made of one piece or the probe portion 11 may be affixed to the housing by a sealed connection.

The housing itself is preferably constructed of a durable but light plastic material to facilitate the handling thereof during the use of the thermometer.

Disposed on the top 15 on the housing is a window through which Nos. 16 or other indicia may be displayed from the interior thereof. While the windows 16 are shown on the top of the housing for convenience, it is, of course, possible to provide for these windows and the consequent display of indicia at any place around the sides of the housing.

The interior of the housing is sealed and contained therein in a switch 17 which is illustrated in the form of a mercury switch although any equivalent switch means may be utilized.

A battery 18 is also located within the sealed housing. While a battery has been illustrated as the power source, a plug may be utilized for connection to a conventional electrical power supply in the usual way. When the mercury switch is in its "on" position, that is as shown in FIG. 1, electrical power is being supplied to the components by the battery 18.

Lead wires 19 and 20 emanate from the battery and are connected to the mercury switch 17 and to a conventional electronic analog to digital converter 21, which is also contained within the housing. Another wire 22 establishes the electrical connection between the switch and the analog to digital converter when the switch is in its operating position.

An electronic digital read-out 23 is illustrated at the top of the housing and an electrical connection is made between the digital read-out 23 and the analog to digital converter 21 in any conventional way as, for example, by wires 24 and 25.

A screw 26 which has the usual seal may be used to obtain access to the battery carrying portion of the thermometer for the replacement of battery sources of power.

It may thus be seen that the thermometer of the present invention is completely sealed against any leakage of liquids into any portion thereof including the portion containing the electronic components such as the switch 17, the battery 18, the analog of digital converter 21, the digital read-out 23 and all leads connecting the same.

Figure 2:
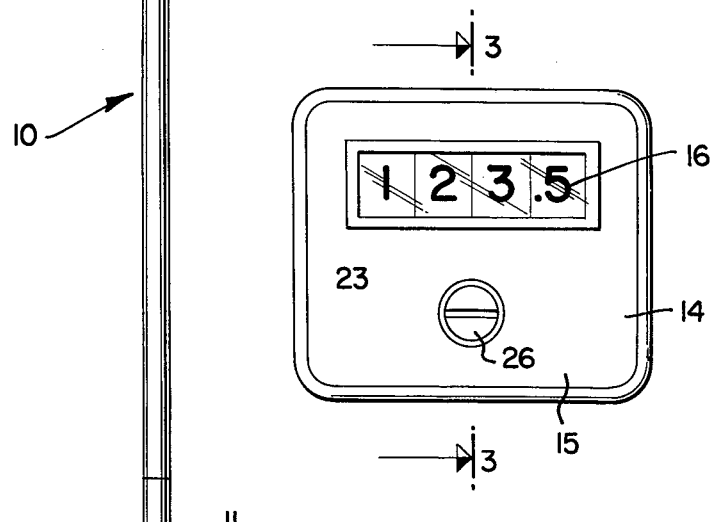
FIG. 2 is a top view of the thermometer showing the digital read-out.

The thermometer is of such construction that it may be hand held and manually manipulatable. When the thermometer is held in the upright position as illustrated, it will be noted, as shown in FIG. 2, that the mercury within the switching means establishes the contact between the wires 19 and 20 to provide a circuit for the passage of current through the battery to the analog to digital converter. In this position the temperature around the probe is measured and converted into numerical values into digital read-out window 16. As a consequence, it is simple to determine the temperature of any object subject to temperature measurement by this completely sealed-in device.

Figure 4:
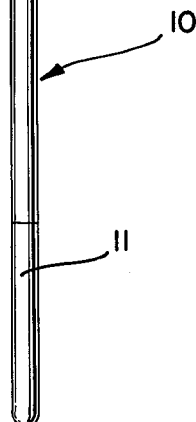
FIG. 4 is a partial sectional view of the switch of the thermometer of the present invention in its off position.
Figure 4:
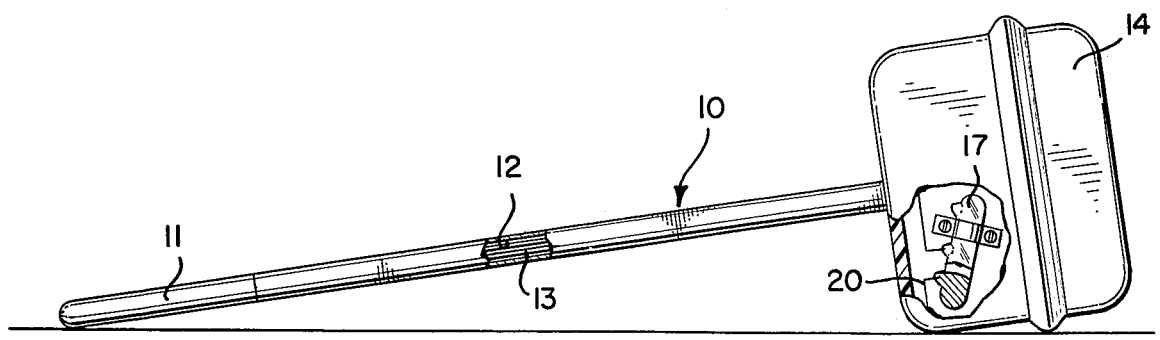

In accordance with the present invention there are no exposed switching means. Instead, there is provided a mercury switch casing of such dimensions that when the thermometer is held in its operative or upright position contact is established. However, when the thermometer is merely placed in a substantially horizontal position which is normal when the thermometer is not in use, the mercury will flow to that portion of the thermometer in which no contact is established between the wires 19 and 20, as illustrated in FIG. 4. In this position there is no drain whatsoever upon the battery or other power source and thus, automatically, the power supply is cut off when the thermometer is not in use.

The advantages obtained by the aforesaid construction are numerous for there can be no inadvertent operation of the thermometer with the consequent drain on the battery and where, of other parts also with the arrangement described, no exterior switches whatsoever are necessary and leaks into the system are prevented.

It is to be understood that while the invention has been described in an illustrative form thereof, this description is not to be considered as limiting the scope of the invention, which is defined by the appended claims.

I claim:

1. An electronic thermometer comprising:
  a sensing head for measuring the ambient temperature;
  power means;
  an electronic analog to digital converter;
  electronic digital read-out means;
  position responsive switch means connected to said power means and to said analog to digital converter for establishing an electrical connection therebetween;
  sealed housing for said power means, said analog to digital converter, said electric digital read-out means and said switch means;
  said thermometer being maintainable in a substantially horizontal position and in a substantially vertical position, and said electrical connection being established for measuring the ambient temperature when the thermometer is maintained in one of said positions and being broken when said thermometer is maintained in the ohter of said positions.

2. The electronic thermometer of claim 1 in which the ambient temperature is measured by the thermometer in substantially vertical position and the electrical connection is broken when the thermometer is in substantially horizontal position.

3. The electronic thermometer of claim 1 in which the switch means comprise a mercury switch.

4. The electronic thermometer of claim 3 in which the power means comprise a battery.

* * * * *